(12) United States Patent
Hofmann

(10) Patent No.: US 8,256,966 B2
(45) Date of Patent: Sep. 4, 2012

(54) ROLLER BEARING ARRANGEMENT

(75) Inventor: Georg Hofmann, Mlstelgau (DE)

(73) Assignee: IMO Momentenlager GmbH (DE)

( * ) Notice: Subject to any disclaimer, the term of this patent is extended or adjusted under 35 U.S.C. 154(b) by 387 days.

(21) Appl. No.: 11/635,140

(22) Filed: Dec. 7, 2006

(65) Prior Publication Data
US 2007/0147720 A1   Jun. 28, 2007

(30) Foreign Application Priority Data
Dec. 15, 2005   (DE) .......................... 10 2005 060 499

(51) Int. Cl.
*F16C 33/04* (2006.01)
*F16C 19/24* (2006.01)
*F16C 33/60* (2006.01)

(52) U.S. Cl. ......... 384/493; 384/504; 384/557; 384/905

(58) Field of Classification Search .................. 384/493, 384/557, 905, 523, 531, 532, 504, 512, 613, 384/499, 500, 513, 609
See application file for complete search history.

(56) References Cited

U.S. PATENT DOCUMENTS

| | | | | |
|---|---|---|---|---|
| 3,549,220 A | * | 12/1970 | Robinson et al. | 384/535 |
| 3,640,591 A | * | 2/1972 | Eklund | 384/493 |
| 3,986,754 A | * | 10/1976 | Torrant | 384/504 |
| 4,489,573 A | * | 12/1984 | Engelfried et al. | 66/8 |
| 5,031,421 A | * | 7/1991 | Engelfried et al. | 66/8 |
| 6,307,292 B1 | * | 10/2001 | Brown | 310/90 |

FOREIGN PATENT DOCUMENTS

DE   3300655 A1 *   7/1984

* cited by examiner

*Primary Examiner* — Thomas R Hannon
*Assistant Examiner* — Alan Waits
(74) *Attorney, Agent, or Firm* — Pandiscio & Pandiscio

(57) ABSTRACT

The invention is directed to a roller bearing arrangement comprising two rings arranged mutually concentrically and at least regionally inside each other, and comprising a gap between these rings, so that they are rotatable in opposite directions about an imaginary axis at the center of the rings and approximately perpendicular to the ring plane, wherein disposed in the region of a gap portion situated between the rings and surrounding the axis of rotation at an approximately constant radius is at least one raceway for at least one row of rollers, each having a rotationally symmetrical shape and rolling displacingly between the rings, each of which rollers, when the rings and the rollers are at the same temperature, has at least one point or region of contact with the raceway portions on each of the two rings, so that the radial and/or axial clearance between the two rings is equal to zero or at least is negligibly small; and comprising a mechanism for compensating for temperature-induced radial changes in the cross section of the raceway for at least one row of rollers, so that the compressive stress exerted on the rollers and/or the clearance between the rings remains approximately constant, even in the case of a temperature difference between the rings and/or between them and the rollers.

12 Claims, 1 Drawing Sheet

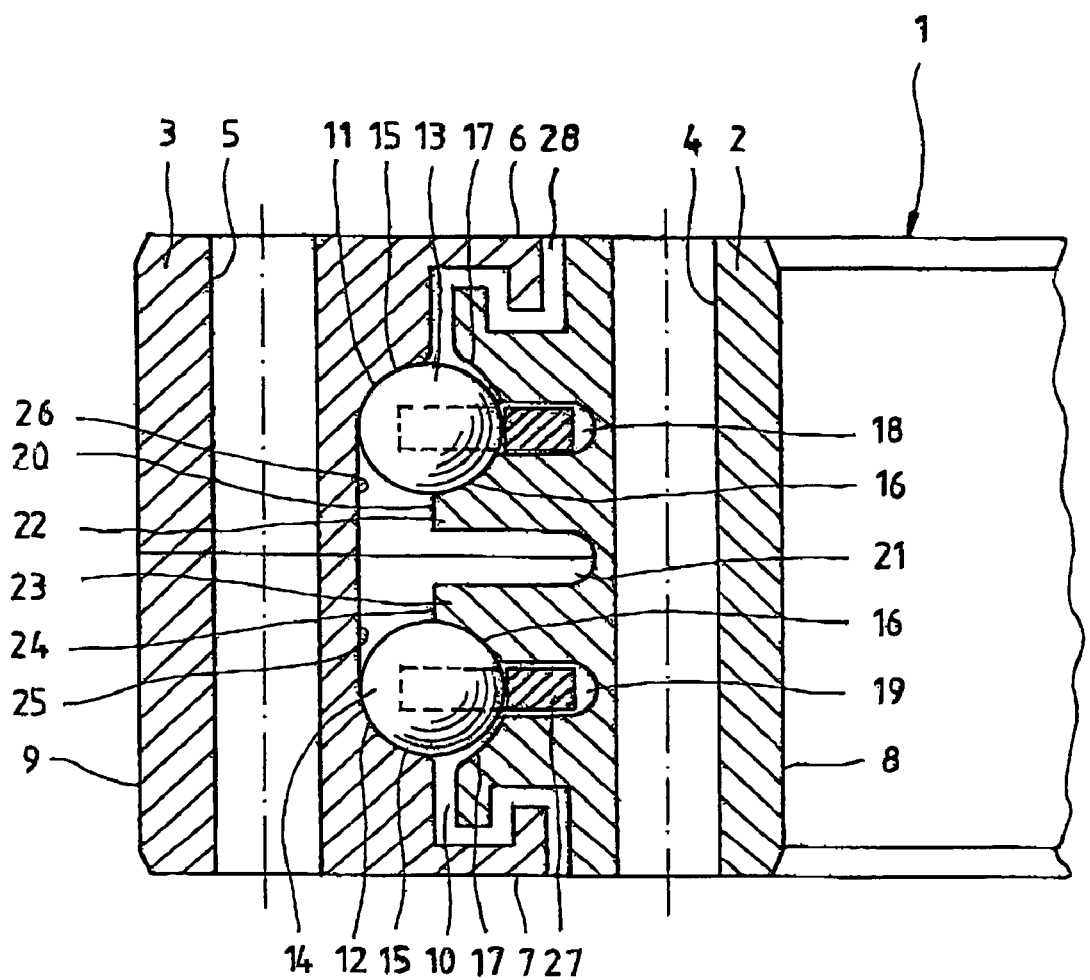

ROLLER BEARING ARRANGEMENT

BACKGROUND OF THE INVENTION

1. Field of the Invention

The invention relates to a roller bearing arrangement, particularly for a rotary connection, comprising two rings arranged mutually concentrically and at least regionally inside each other, and comprising a gap between the rings, so that they are rotatable in opposite directions about an imaginary axis at the center of the rings and approximately perpendicular to the ring plane, wherein disposed in the region of a gap portion situated between the rings and surrounding the axis of rotation at an approximately constant radius is at least one raceway for at least one row of rollers, each having a rotationally symmetrical shape and rolling displacingly between the rings, each of which rollers, when the rings and the rollers are at the same temperature, has at least one point or region of contact with the raceway portions on each of the two rings, so that the radial and/or axial clearance between the two rings is equal to zero or at least is negligibly small.

2. Description of the Prior Art

In roller bearings, the two rings are connected to different system components that frequently are not connected in any other way. By the same token, since contact between the individual rollers and the two rings is limited to extremely small respective areas, the rings are largely thermally decoupled from each other. Depending on load conditions, therefore, one of the two rings can have a very different temperature from the other. This is accompanied by a difference in thermal expansion and, ultimately, a change in the cross section of the raceway for the rollers. If, due to higher temperature, the outer ring expands more than the inner one, a clearance forms between the rings which is unacceptable in many applications, for example in the case of rotating bearings or rotary connections in medical technology, especially in imaging scanners for medical technology. Conversely, if—again, due to higher temperature—the inner ring expands more than the outer one, then the pressure force exerted on the roller bearings increases, resulting in increased wear. Both are to be avoided in high-quality equipment.

Hence, the problem initiating the invention, in a roller bearing arrangement of the species cited, particularly for a rotary connection, is to ensure that the pressure force exerted on the rollers is always as constant as possible, i.e., does not vary over time.

SUMMARY OF THE INVENTION

The solution to this problem, in a roller bearing arrangement of the species cited, is to provide a mechanism for compensating for temperature-induced radial changes in the cross section of the raceway for at least one row of rollers, so that the compressive stress exerted on the rollers and/or the clearance between the rings remains approximately constant, even in the case of a temperature difference between the rings and/or between them and the rollers.

The invention proceeds in this from the knowledge that it is practically impossible to control the disturbance variables that govern the pressure force exerted on the rollers, particularly temperature differences between the rings and/or between the rings and the rollers. On the contrary, the invention accepts such variables and instead minimizes their impact on the cross section of the raceway for the rollers, with the effect that they always experience nearly unchanged operating parameters despite disruptive environmental influences.

Pursuing this inventive idea, it is provided that a region of a raceway portion on at least one ring is, to a limited extent, resiliently configured. Such resilience permits a slight—countervailing—change in the cross section of the raceway in response to changes in environmental influences, and thus, compensation for such changes. The term "resilient" is, of course, relative, since almost any structure, when exposed to forces of sufficient intensity, will show some elastic deformation before plastic deformation takes over. What is meant here, however, is not the range of elastic deformability of the roller bearing itself, but rather a particular elasticity of a structure comprising a raceway portion, especially relative to the body of the ring concerned, and one that is below the force range of resilient deformability of that body. In particular, the resilient property can be created by imparting a particular geometry to a substructure of the ring concerned.

It has proven advantageous for a roller to contact a resilient raceway portion approximately in the region of the center line through its cross section facing the roller. To avoid increased friction, the radius of curvature of the raceway is usually minimally larger than the radius of curvature of a roller rolling along it (assuming that non-cylindrical rollers are being used). The actual region of contact is (nearly) punctiform in this case. The position of this approximately punctiform region of contact can be determined by the geometry of the raceway cross section. For reasons of stability and operating safety, among other things, this region of contact should be disposed approximately centrally to the resilient region of the raceway.

Another advantageous design precept states that the straight line from the center of a roller to its point of contact with the resilient raceway portion forms an angle with the line of shortest distance between that roller and the axis of rotation of the roller bearing arrangement that is greater than 20°, preferably greater than 30°, particularly greater than 40°. By virtue of this measure, the direction of the yielding region of the raceway can be chosen largely at random. In a yielding region of the raceway, the contact point migrates along the surface of the raceway. Since in the case of a vanishing temperature difference between the inner and the outer ring the contact point is located approximately centrally to the resilient portion of the raceway, it can swerve in either direction, depending on the direction of the temperature differential—i.e., it can compensate for either a constriction or an expansion, due to disturbing influences, of the space between the raceway portions of the two rings.

The invention further provides for a region of at least one raceway portion to be disposed adjacent a spring of a ring. The term "spring" is intended in this context to mean the counterpart of a groove, i.e., an elongate, flat structure. Due to their geometry, exposed structures of this kind exhibit heightened elasticity, especially in the region of their free edge or working face.

In keeping with its task of carrying a portion of the endless raceway for the rollers, the spring should be configured as endless and should pass all the way around the respective ring, so that the rolling-travel or contact points of the rollers constantly move along the resilient region of the raceway. Excessive noise is prevented by the consistent characteristics of the raceway.

The raceway portion is preferably formed at the free end of the spring, while the foot opposite that end is joined to the respective ring. The elasticity of the region carrying the raceway portion is maximal with such an arrangement.

The center line or longitudinal axis of the spring cross section, from the foot to the free end of the spring, should intersect the perpendicular bisector of the cross section through the raceway portion formed thereon, particularly its line of symmetry, at an angle that is not zero. This means that the end of the spring carrying the raceway portion is asymmetrical with respect to the longitudinal axis of the spring. This in turn has the effect that upon lateral movement of the spring, the roller is able to move relative to the raceway portion in the manner of a sphere, which can move along an oblique—and to that extent, also asymmetrical—plane. In this way, a lateral movement of the spring parallel to the axis of rotation of the roller bearing arrangement is thereby transformed into a swerving movement of the roll point of the roller radially to said axis of rotation.

If the angle between the intersecting center lines is greater than 20°, preferably greater than 30°, particularly greater than 40°, the result is a relatively high transformation ratio of the (axial) movement of the spring into the (radial) displacement of the roll point, i.e., a relatively large radial shift in the roll point of the roller.

On the other hand, the angle between the intersecting center lines should be no greater than 70°, preferably smaller than 60°, particularly smaller than 50°, since this could easily lead to unstable conditions, for example due to vibration of the inventive roller bearing arrangement.

The invention recommends that at least one flank of the spring carrying a raceway portion be formed by a slot-shaped recess. By this simple measure, it becomes possible to resiliently configure a region of the raceway that is usually in a protected location inside a roller bearing.

Further advantages are gained by having the longitudinal axis through a slot bounding a spring extend approximately perpendicularly to the axis of rotation of the roller bearing arrangement, particularly at the level of the center of the raceway, i.e., in the plane within which the centers of the rollers move. In this case, the adjacent spring does not lie on this center-point plane of the rollers, but rather to one side of it, thereby creating the desired asymmetry of the resilient raceway portion.

In addition, a slot disposed symmetrically to the center-point plane of the rollers is especially suitable for receiving a spacer ring for the rollers. For one thing, a cage of this kind keeps the rollers at equidistant spacings; in addition, assembly of the bearing is simplified, since even a large number of rollers can be united and held together by a spacer ring and can therefore be installed in the bearing in a single operation.

From an overall standpoint, of course, only one row of rollers need be provided, having two contact points with the raceway portion of each ring; in such a case, two raceway portions or raceway springs that are able to move relative to each other, and in particular are separated by a slot disposed therebetween, could be provided for two adjacent contact points of a roller on the same ring. To prevent notch effects from occurring in the region of the bottom of the slot in this case, the invention recommends using two raceways for each row of rollers. In such cases, each roller requires only one point of contact with each ring, which point can be offset from the center of the roller in the axial direction of the axis of rotation of the roller bearing.

This embodiment makes it possible for the two raceways to be offset from each other in the axial direction of the axis of rotation of the roller bearing. Such an offset increases the stability of the bearing against tilting moments.

In addition, the two mutually axially offset raceways, each intended for one row of rollers, can be disposed symmetrically to the common center plane. This produces an even distribution of forces and loads on both rows of rollers, which also has a positive effect on the attainable working life.

For reasons of symmetry, one resilient portion of each raceway should also be disposed on a common ring. In such a case, for example the ring with the non-resilient raceway portions can optionally be implemented with a smaller cross section to keep the space consumption of the inventive bearing as low as possible. This also prevents the two rings from moving axially relative to each other in response to the excursion of one or both springs.

If the resilient portions of the two raceways are adjacent to each other, they strive to press the two rows of rollers apart in the axial direction of the axis of rotation of the roller bearing arrangement. They themselves, conversely, are moved toward each other in the axial direction by the rollers; as a result, there is no notch effect between the two resilient portions.

To permit relative movement between the two adjacent but oppositely deflecting raceway portions, these portions can be separated from each other by a slot.

Since, therefore, the points or regions of contact of the rollers of both rows with the resilient raceway portions of one ring face each other, it follows that the points or regions of contact of the rollers in both rows with the respective raceways of the non-resilient ring face away from each other. These mutually averted contact points press the rollers of different rows toward each other in the axial direction, and thus against the mutually adjacent, resilient raceway portions.

As long as the rollers are loaded in tension, they will orient themselves with respect to the rings such that their points or regions of contact with the raceway portions are disposed approximately in diametric opposition on the two rings, relative to the center of the respective roller. In this way, forces are transmitted through the rollers from one ring to the other only by form closure, i.e. perpendicularly to the surfaces of the rollers, not by friction tangentially to the surfaces of the rollers.

The invention can be improved to that effect by providing one ring with circumferential teeth. This furnishes the option of driving one ring relative to the other and rotating it in a defined manner.

The sets of teeth provided on the raceway(s) of the ring concerned are preferably arranged opposingly, i.e. on the ring surface region facing away from the roller bearing arrangement.

Finally, it is within the teaching of the invention that at least one raceway portion per ring is configured to transmit loads, particularly one raceway portion per ring for each row of rollers. Even elastically constructed raceway portions can readily be used to transmit or help transmit loads, since their load capacity is diminished very little by their relatively high spring stiffness. In addition, the ring without resilient raceway portions can also be provided with two raceway sidewalls per row of rollers, to furnish additional axial guidance for the rollers.

Further features, details, advantages and effects based on the invention will emerge from the following description of a preferred embodiment thereof and by reference to the drawing. The latter shows a cross section through the rings of a roller bearing arrangement according to the invention, taken along a plane extending radially to the axis of rotation.

BRIEF DESCRIPTION OF THE DRAWING

FIG. 1 is a sectional view through rings of a roller bearing arrangement, taken along a plane extending radially to an axis of rotation.

DESCRIPTION OF THE PREFERRED EMBODIMENT

The drawing shows a section through the rings of a so-called double-row angular-contact ball bearing 1 in an X arrangement. This ball bearing 1 comprises an inner ring 2 and an outer ring 3. The two rings 2, 3 are able to rotate symmetrically to and in opposite directions about an axis of rotation which, owing to the size of the illustrated bearing, is located well beyond the right margin of the sheet. For connection to machine or system components and/or to a chassis or footing, both rings 2, 3 are traversed by a plurality of annularly arranged bores 4, 5 arranged parallel to the axis of rotation, through which fastening screws are to be passed.

In the example shown, the overall cross section through the two rings 2, 3 is approximately rectangular, nearly square, with chamfered corners between each end face 6, 7 and, respectively, the inner jacket surface 8 and the outer jacket surface 9. The outer ring 3 is split approximately along its center plane to facilitate assembly.

The two rings 2, 3 are separated from each other by a gap 10. Disposed in the region of this gap are two raceways 11, 12, mutually offset in the axial direction, each of which is intended for one row of spherical rollers 13, 14. Each raceway 11, 12 has at least one raceway portion 15, 16, 17 on each ring 2, 3. Each raceway portion(s) 15, 16, 17 of a ring 2, 3 defines in cross section approximately a circular segment of less than half a circle.

The radius of curvature of a cross section through a raceway portion 15, 16, 17 is minimally larger than the radius of a ball 13, 14, so that, no more than one approximately punctiform region of contact exists between a ball 13, 14 and a ring 2, 3 or raceway portion 15, 16, 17, thereby minimizing friction.

On the other hand, when all rings and balls 2, 3, 13, 14 of the ball bearing 1 are at the same temperature, the diameter of a ball 13, 14 is minimally larger than the clear diameter of a raceway 11, 12 between the two rings 2, 3, and all the balls 13, 14 are therefore subjected to a negligible amount of compressive stress.

Should inner ring 2, for whatever reason, assume a higher temperature than outer ring 3, then inner ring 2 will expand more than outer ring 3, thereby narrowing gap 10. In a conventional ball bearing, the pressure force exerted on the balls would thus be intensified, the balls would be subjected to increased wear and the ball bearing 1 would fail prematurely.

In the case of the inventive ball bearing 1, however, a precaution has been taken to eliminate negative effects of such a temperature difference. This mechanism consists, inter alia, in providing each of the raceway portions 11 of one ring—inner ring 2 in the example shown—with a slot 18, 19. These slots 18, 19 are each aligned with the centers of the balls 13, 14 of one row.

In addition, a jacket surface 20 facing the gap 10 comprises, in the region between the two raceways 11, 12 an additional, circumferential slot 21 extending along the center plane or plane of symmetry of the ball bearing 1.

Consequently, a spring 22, 23 is left between the circumferential slot 21 of ball bearing 1 and either slot 18, 19 aligned with a row of balls 13, 14. Slots 18, 19, 21 preferably are all approximately the same depth. They extend from the jacket surface 20 facing the gap 10 over approximately half the radial extent of the inner ring 2, as can be seen from the drawing. The length of the spring cross sections 22, 23, measured radially relative to the axis of rotation of the bearing, thus is greater than their width measured axially to the axis of rotation of the bearing, and the springs 22, 23 are therefore able to move to a limited extent laterally, i.e. toward the axis of rotation of the ball bearing 1.

Disposed in the region of a free end 24 of each of the springs 22, 23 is a raceway portion 16 for a row of balls 13, 14. These raceway portions 16 do not, however, lie symmetrically to the longitudinal axis or longitudinal plane through the springs 22, 23, but are instead displaced toward the mutually averted edges of the spring ends 24. The balls 13, 14 abut these raceway portions 16, whereas under normal conditions the other raceway portions 17 on the inner ring 2 have no point of contact with the balls 13, 14.

Raceway portions 16 consequently press the balls 13, 14 away from each other in the axial direction, but at the same time also press them radially outward. Both force components are absorbed by a counterforce exerted by the associated raceway portion 15 on the outer ring 3; outer ring 3, so to speak, rests on inner ring 2 via balls 13, 14.

The raceway portions 15 of outer ring 3 are not resiliently configured, however. They are instead formed by a trough-shaped, circumferential recess 25 in the radially inwardly disposed jacket surface 26 facing the gap 10. The flanks of this recess 25 form the two raceway portions 15 of outer ring 3. A cross section through these flanks or raceway portions 15 approximates a quarter circle. The floor of the recess 25 has an approximately planar cross section.

Since when the rings 2, 3 are in static thermal equilibrium the clear diameter of a raceway 11, 12 is slightly smaller than the diameter of a ball 13, 14, the latter are subjected to compressive stress under normal circumstances.

If a temperature difference develops between inner and outer rings 2, 3, then the gap 10 narrows or widens slightly, depending on the direction of said temperature difference. However, since the springs 22, 23 are able to move to a limited extent in the axial direction of the axis of rotation, the clear diameter of a raceway 11, 12 is always approximately equal to the diameter of a ball 13, 14, regardless of the width of the gap 10.

If the gap 10 widens, the springs 22, 23 move away from each other and the mutually assigned raceways 15, 16 move closer together. Conversely, if the gap 10 narrows, then the two springs 22, 23 are pressed toward each other or together by the balls 13, 14, the balls 13, 14 thereby creating the necessary space for themselves.

Enough room remains in the slots 18, 19 for each of them to accommodate a ball cage 27 to maintain constant spacing between the individual balls 13, 14 of a row.

On the far side of the two rows of balls 13, 14, gap 10 extends in a meander shape to each of the end faces 6, 7 of ball bearing 1, in the manner of a labyrinth seal 28. Alternatively or supplementarily thereto, sealing rings, particularly rubber seals, can be provided. The empty space of the gap 10 between such sealing rings can be filled with a lubricant, for example grease.

Teeth can be provided on a jacket surface of the ball bearing 1, particularly on inner jacket surface 8 or on outer jacket surface 9, to meshingly engage with a driven sprocket or a driven worm gear.

Further modifications may be made within the scope of the invention; for example, the springs 22, 23, with the slots 18, 19, 21 bounding them, can be arranged on the jacket surface 26 of outer ring 3 that faces gap 10, while recess 25 is then disposed on jacket surface 20 of inner ring 2. One spring 22 could even be disposed on inner ring 2 and one spring 23 on outer ring 3.

The invention claimed is:

1. A double-row angular-contact roller bearing assembly comprising:
    a first ring and a second ring arranged concentrically relative to each other and defining a gap between said rings, said rings being rotatable in opposite directions about a single axis of rotation;
    a first raceway defined by each of said rings having a first concave portion therein, and a second raceway defined by each of said rings having a second concave portion therein, said raceways being disposed in the gap between said rings at a substantially constant radial distance from centers of said rings;

a first row of rollers and a second row of rollers, wherein said first row of rollers is adapted for rolling in said first raceway and said second row of rollers is adapted for rolling in said second raceway;

each of said rollers of said first row of rollers having regions of contact with the first concave portion of said first raceway, each of said rollers of said second row of rollers having regions of contact with said second concave portions of said second raceway; and a structure for compensating for temperature-induced radial changes in cross sections of said raceways, such that compressive stress exerted on said rollers and clearance between said rings remains substantially constant between said rings, and between said rings and said rollers;

said compensating structure comprising a) a first leaf spring and a second leaf spring extending radially from one of said rings;

b) the first concave portion and second concave portion of said raceways of said one of said rings being formed integrally with a free end of said leaf spring, respectively, and wherein both of said leaf springs are integral with said one of said rings and said leaf springs give resilience to the respective raceway portions thereon;

c) each of said leaf springs having two opposed flanks, each flank being defined by a slot-shaped recess; wherein d) a first recess of said recesses is aligned with a center of said rollers of said first row of rollers, and a second recess of said recesses is aligned with a center of said rollers of said second row of rollers;

e) said leaf springs being adjacent to each other, such that they strive to press the two rows of rollers apart in the axial direction of the axis of rotation of the roller bearing assembly; and f) each roller of said rows of rollers exhibits no more than a substantially punctiform region of contact between the roller and each of said rings.

2. The roller bearing assembly in accordance with claim 1, wherein the springs carrying said raceway portions both extend from an inner one of said rings.

3. The roller bearing assembly in accordance with claim 2, wherein a foot of each spring carrying one of said raceways is connected to an inner one of said respective rings.

4. The roller bearing assembly in accordance with claim 1, wherein said raceways are spaced from and opposing each other.

5. The roller bearing assembly in accordance with claim 4, wherein said raceways are configured symmetrically.

6. The roller bearing assembly in accordance with claim 5, wherein said two adjacent leaf springs are separated from each other by one of said slot-shaped recesses.

7. The roller bearing assembly in accordance with claim 1, wherein said regions of contact of said rollers with respective raceway portions of said one of said rings face away from each other.

8. The roller bearing assembly in accordance with claim 1, wherein said regions of contact of said rollers with the raceway portions on said rings are disposed diametrically opposite each other.

9. The roller bearing assembly in accordance with claim 1, wherein at least one of the raceway portions of each of said rings is configured to transmit a load.

10. The roller bearing assembly in accordance with claim 1, wherein an axis of each of said recesses extends perpendicularly to an axis of rotation of said assembly.

11. A double-row angular-contact ball bearing assembly comprising a double-row angular-ball bearing for a rotary connection, the ball bearing comprising;

two rings arranged concentrically, one of said rings at least regionally inside the other of said rings and defining a gap between said rings, said two rings being rotatable in opposite directions about an axis of rotation at the centers of said rings and substantially perpendicular to planes of said rings;

two raceways being disposed in the gap between said rings and surrounding the axis of rotation at a substantially constant radius;

two rows of rollers disposed in one of said raceways, respectively, each of said rollers having a rotationally symmetrical shape and adapted to roll between said rings;

each of said rollers, when said rings and said rollers are at the same temperature, having at least one point of contact with said raceway on each of said two rings;

a mechanism for compensating for temperature-induced, radial changes in the cross section of said raceway for said at least one row of rollers, such that compressive stress exerted on said rollers, and/or the clearance between said rings, remains substantially constant, in the event of a temperature difference between said rings and said rollers, wherein a) two leaf springs each having a free end area provided with a portion of said raceways therein, both springs being disposed on one of said rings and extending radially from said one of said ring and each of said springs giving resilience to the respective portion of said raceway thereon;

b) each of said leaf springs having two opposed flanks, each flank being defined by a recess; wherein c) a first of said recesses is aligned with a center of said rollers of one of said rows of rollers and a second recess of said recesses is aligned with a center of said rollers of the other of said rows of rollers;

d) the leaf springs being adjacent to each other, such that they strive to press the two rows of rollers apart in the axial direction of the axis of rotation of the roller bearing assembly; and wherein e) each of said rollers comprises a ball which exhibits no more than a substantially punctiform region of contact between the ball and each of said rings.

12. The roller bearing assembly in accordance with claim 11, wherein an axis of each of said recesses extends perpendicularly to an axis of rotation of said assembly.

* * * * *